United States Patent [19]

Huba

[11] Patent Number: 5,314,851
[45] Date of Patent: May 24, 1994

[54] REACTIVATION OF SOLID OXIDATION CATALYSTS

[76] Inventor: Francis Huba, 5521 80th St. N. #312, St. Petersburg, Fla. 33709

[21] Appl. No.: 78,359

[22] Filed: Jun. 21, 1993

Related U.S. Application Data

[63] Continuation-in-part of Ser. No. 972,859, Nov. 6, 1992, abandoned.

[51] Int. Cl.$^5$ .......... B01J 38/48; B01J 38/52; B01J 38/12; F01N 3/10
[52] U.S. Cl. .......... 502/22; 60/274; 502/33; 502/38
[58] Field of Search .......... 502/22, 23, 33, 38, 502/51, 52

[56] References Cited

U.S. PATENT DOCUMENTS

| | | | |
|---|---|---|---|
| 1,678,627 | 7/1928 | Jaeger | 502/51 |
| 3,460,901 | 8/1969 | Massa et al. | 60/274 |
| 4,670,233 | 6/1987 | Erdemannsdoerfer et al. | 423/213.2 |

FOREIGN PATENT DOCUMENTS 127650  7/1984  Japan .......... 502/22

*Primary Examiner*—Paul E. Konopka
*Attorney, Agent, or Firm*—Walter J. Monacelli

[57] ABSTRACT

A novel process and chemicals are disclosed for the rejuvenation of oxidation catalysts used to reduce the production of pollutants in the exhaust gas emanating from an internal combustion engine, particularly catalysts used in the converters of automobiles and other combustion engine powered vehicles. The rejuvenation may be done in place, within minutes, without removing the holding containers or converters or the catalyst from them. The rejuvenation is effected by treating the used catalyst with an aqueous solution of a peroxide which is decomposable at the temperature of treatment. The concentration of solution, the proportion of solution per unit volume of catalyst and the time of treatment are important factors in the effectiveness in regenerating or rejuvenating the catalyst.

13 Claims, No Drawings

REACTIVATION OF SOLID OXIDATION CATALYSTS

This application is a continuation-in-part of application Ser. No. 07/972,859 filed Nov. 6, 1992, now abandoned.

BACKGROUND OF THE INVENTION

1. Field of the Invention

This invention relates to the regeneration of the activity of oxidation catalysts, particularly those used to oxidize hydrocarbons and carbon monoxide in automobile exhaust gases. The most familiar such catalysts are those in the catalytic converters of automobiles.

The noxious components in the exhaust gases emitted by internal combustion engines are regarded as being one of the primary causes of air pollution and smog. Reduction of the amounts of these pollutants is now required by law in most industrially advanced countries. By catalytic conversion, the exhaust gases and atmospheric oxygen pass through the catalytic converter where the noxious gases are converted to harmless water, carbon dioxide and nitrogen gas.

However, in time the activity of the catalyst is gradually reduced to the level at which the concentrations of pollutants exceed the limits set by the law. At the point, when the catalyst fails to perform as required, it must be replaced with a new one, which is a rather costly event. As the stringency in controlling the emission increases, so does the cost of the catalyst replacement. The most desirable and economical way to eliminate this mounting cost, and also save the expensive noble metals contained in the catalytic converters, such as platinum, palladium and rhodium would be to apply a simple, fast and inexpensive method to restore the activity of the deactivated catalysts. Such a method however, is not known and used up to this time. Now this invention makes this desire a reality.

The actual catalyst regenerations of this invention, performed in converters of cars, prove that this novel process is clean, fast and economical, reduces the hydrocarbon and carbon monoxide pollution by as much as 95%, extends the catalytic activity for a length of time close to that of a new catalyst, and retains, or even improves, the hardness of the catalytic support.

2. Description of the Prior Art

In the prior art, a rejuvenation of automotive emission control catalyst is claimed in U.S. Pat. No. 4,039,471 by exposing the catalyst to reducing atmosphere to reduce the lead and phosphorous contaminants at 300°-700° C. There is no claim on reducing other pollutants, such as hydrocarbons and carbon monoxide which need an oxidizing environment.

U.S. Pat. No. 5,071,802 claims the burning of the carbonaceous materials deposited on the catalyst in the presence of alcohol together with oxygen-containing gas. The difficulty with this process is that the carbon is not the only contaminant, and that the quantity of the carbonaceous matter is unknown. Therefore, the ratio of alcohol-oxygen and carbon are not easily balanced for achieving the required results. An incomplete burning produces more unburned hydrocarbons and carbon monoxide. In addition to these drawbacks, the patent does not apply the process to the exhaust of combustion engines, rather it applies it to the synthesis of organic compounds and cracking petroleum products.

U.S. Pat. No. 3,824,193 uses solution of alkaline metal hydroxides for regeneration of hydrogenation catalyst at 100° to 500° C. Example 10 of this patent shows that its process is ineffective for oxidation catalysts. No claim is made for using this method for regeneration of oxygenation catalysts.

U.S. Pat. No. 4,615,992 describes a regeneration process in which the catalyst is moving down in a pipe reactor against a stream of 3-5% oxygen gas to burn off carbon deposits.

U.S. Pat. No. 4,792,435 discloses generating oxygen gas by decomposing hydrogen peroxide by the platinum group metals deposited on ceramic carriers in heated chambers in a controlled feed rate.

A reference in Chemical Abstract 1986 208666 d refers to a method in which the number 1 plug of a car engine is disconnected and the temperature of the catalyst is allowed to rise to 800-1100 degrees C. for 3-120 minutes. A platinum-cerium-ruthenium catalyst was regenerated at 750° C. in 5 minutes. The emissions of carbon monoxide and nitrogen oxides were reduced from 72 to 94% and from 54 to 60% respectively.

A reference, also in Chemical Abstract 1991, volume 114,151432 r, mentions washing a catalyst with water while irradiating with ultrasound. No report on improvement or type of catalyst is given and it was done in a separate vessel and not in an auto converter.

Three references were cited against applicant's parent application Ser. No.972,859, filed Nov. 6, 1992, namely, Jaeger U.S. Pat. No. 1,678,627; Massa et al U.S. Pat. No. 3,460,901; and Erdmannsdoefer U.S. Pat. No. 4,670,233.

Jaeger is directed to a system using an "acidogen" and an oxygen containing gas. The meaning of "acidogen" is not clear but is illustrated as non-metallic acid radical such as nitric acid, sulfur trioxide, sulfur dioxide, etc. The present application does not use such materials nor does it use oxygen as the oxidizing or regenerating material.

Massa et al makes no reference to regenerating an oxidation catalyst but instead teaches the use of solutions of 20-35% hydrogen peroxide in very small amounts of aspirated material to reduce hydrocarbon and carbon monoxide. However there is no teaching that this process continues to decrease these pollutants once the feeding of hydrogen peroxide is terminated. Therefore the treatment does not affect the activity of the oxidation catalyst. Massa et al use more concentrated and more dangerous concentrations of hydrogen peroxide in small aspirated amounts and differs radically from the present process in that there is no regeneration effect. Calculations from the data given in Massa et al show that the amount of peroxide solution per liter of oxidation catalyst is very low and is in an ineffective range.

In the Massa patent, the quantity of the hydrogen peroxide is from 267 times to 12,000 times less then is needed to reactivate a catalyst in a catalytic converter for a motor vehicle.

Table 1 in the Massa patent shows that the highest dosage of $H_2O_2$ is 2.5 cubic centimeter 30% $H_2O_2$ per minute.

$$2.5 \times 0.3 = 0.75 \text{ gram } H_2O_2$$

The present application use of $H_2O_2$ even at the lowest dosage, is $$200 \, ml \times 1\% = 200 \, gr$$

$$200 \, gr/0.75 = 267 \text{ times more}$$

If the preferred quantity, that is, one liter of 10% $H_2O_2$ in one minute is used, the dosage is $$\text{from } (200 \times 10)/0.75 = 2,267$$

$$\text{to } (1,000 \times 10)/0.75 = 6,666 \text{ times more}$$

than Massa used in his experiment.

The quantity of the $H_2O_2$ Massa used was not even enough to oxidize the CO and hydrocarbon in the test gas. In Table 1, the highest 2.5 cubic centimeter (3rd line in the table) has still left 0.24% of the 0.38% HC (by I.R.), that is 0.091%, which is equivalent to 910 parts per million of hydrocarbon.

This could be because the $H_2O_2$ was not enough, or the concentration became too low, or the residence time was not long enough, or a combination of all these. This 910 ppm HC is too much for the present-day clean air regulations. In Florida, for example, the maximum allowable HC emission is 220 PPM. This is expected to be reduced to the 100 ppm level as soon as a method is available for this. The present invention fulfills this requirement.

There are two types of catalyst supports, one support is in bead form, the other is a monolith (honeycomb) form. The volume of the bead support is in most cases about 4 liters. The total surface area of the support is many hundred thousand square inches. Even the much smaller honeycomb support has a superficial surface area of about 15,000 square inches. The actual catalytic surface is many hundred times more. It is obvious, that a 0.75 g quantity of $H_2O_2$, even if none of the $H_2O_2$ would be consumed by the exhaust gas before it reaches the catalyst, it would not noticably improve the catalyst.

Massa used a single cylinder engine for his experiment, and the volume of the formed exhaust gas was far below that from a present multicylinder combustion engine. Consequently the residence time is from 20 to 200 times shorter in the catalytic converter than in Massa's afterburner. Again, the 2.5 g $H_2O_2$/min. would be too diluted, and the residence time too short to be effective.

Erdmannsdoerfer et al describe a method and means for burning or removing soot collected on the exhaust gas filter of an internal combustion engine, particularly a diesel engine. The soot is ignited and burned off. There is no regeneration of an oxidation catalyst. Again very high concentration, and more dangerous concentration, of hydrogen peroxide (60%), etc., are used.

None of the above teachings anticipate applicant's invention as described herein.

THE OBJECT OF THIS INVENTION

The major objectives of this invention include having a simple inexpensive and effective process and chemicals which will reduce the amount of pollutants in the exhaust gases entering the environment from internal combustion engines and minimize the cost in achieving this.

STATEMENT OF THE INVENTION

In the invention described and claimed herein the catalyst regenerating process has numerous desirable features. The most important is the almost complete removal of the quantity of pollutants or poisonous gases, such as hydrocarbons and carbon monoxide from the exhaust gases. Impressive also are the simplicity and safety of the process. It may be done in minutes without removing the catalytic converter or the catalyst from it. A regenerating solution is passed through the hot catalyst bed aided by the exhaust gases from the running engine. The solution enters through the hole made in the exhaust pipe within 40 cm from the catalyst bed upstream to the converter. If practical, the solution can also be fed at the port of the oxygen sensor or via the airline supplying extra air to the converter by a motor driven fan. Furthermore, the process is completely clean. The end products are harmless carbon dioxide and water. The process cost is only a small fraction of the cost of catalyst replacement. This new process therefore, not only improves the quality of air we breath, but is less expensive, and preserves the expensive noble metals of the catalyst. The significance of these on a national scale, and even on a world scale, is self evident. While the process of this invention has the advantage that it can be applied while the oxidation catalyst is in situ, that is still in the vehicle, it is also capable of being applied to the oxidation catalyst or catalytic converter even when this has been removed from the vehicle.

The automobile whose catalytic converter system is to be reactivated is lifted and the motor is run until the temperature of the catalytic converter reaches the usual operating temperature (400°-500° Farenheit). Meantime, a hole is drilled through the side of the exhaust pipe before the catalytic converter and threaded. The diameter of the hole is preferably such as to accommodate a threaded fitting which has not more than a 1/16" I.D.

The hydrogen peroxide decomposes easily in the presence of heat and metals. Such conditions exist in the hot exhaust pipe. In order to minimize this decomposition, the peroxide solution is introduced to the exhaust line as close to the catalytic converter as possible, preferably within 40 centimeters.

The volume and the feed rate of the solution are set so that the combined heat capacity of the gases and the mass of the converter is sufficient to evaporate most of the solution. The evaporation of one liter of 10% aqueous hydrogen peroxide solution, starting from room temperature, requires approximately 635 kilo calories heat. Calculations, confirmed by experiments, found that such heat requirement is satisfied even by a one liter combustion engine during a one minute feed time at and above 2,500 RPM. Larger motors supply proportionally more heat. Based on these, the volume of the peroxide solution used is set according to the size of the catalytic converter, advantageously, using 0.3 to 1 liter of solution per liter of catalyst space. The solution can be fed by pump, or from a pressurized container, or by gravity, in which case the container must be high enough to compensate for the backpressure in the exhaust pipe. The feed line in each case must have a valve to control the flow and a check valve to prevent the backflow of the solution and gases to the feed container. The vapor from the solution adds to the volume of the exhaust gases and increases the space velocity and the stripping of the deposited pollutants from the catalyst.

The rate of feed is affected by the heat that the motor generates. For example, to a small one liter motor the feed time must be 60 or more seconds; for larger engines the feed time is inversely proportional to the size of the motor, but not less than 20 seconds. In cases when the motor's RPM cannot be raised and maintained at 2,500, for example, it must be run at idle, the feeding time must be doubled.

Once the heat capacity-volume-feed rate relation is established, it determines the needed proper concentration of the peroxide, that is, a concentration, which is effective to regenerate the catalyst within the time of the feeding. It was found, that a range from 3% to 18%, or preferably 5% to 15% concentration, is satisfactory.

The maintenance of the RPM of the motor at 2500 is advantageous for several reasons: At this RPM the intake is fuel lean, thus less unburned hydrocarbons and carbon monoxide are formed which in turn consumes less hydrogen peroxide in the exhaust line before it reaches the catalyst. The heat capacity of the gas is larger because its volume and its temperature are higher, (rises from about 500° F. at idle to about 1,000 degree F. at 2,500 RPM in pipe close to the catalyst). Also the larger volume has a higher flow velocity and turbulency, this causes a faster heat transfer to the peroxide solution, which in turn evaporates faster and minimizes the chance of flooding the catalyst.

The process of this invention for restoring or regenerating the activity of an oxidation catalyst used for reducing undesired pollutants, such as hydrocarbons, carbon monoxide, etc., from the exhaust gas emanating from an internal combustion engine comprises the step of feeding a peroxide solution into the oxidation catalyst. The peroxide is one which decomposes at the temperature at which the oxidation catalyst is maintained. The solvent for this solution is preferably water, a mixture of water and ethanol or a mixture of water and isopropanol. The aqueous mixtures should have at least 50% by weight of water, preferably at least 80% by weight of water. In some cases the peroxide may not be completely dissolved with the undissolved portion being carried as a suspension in the solution of dissolved material. When water is the only solvent, the peroxide can remain in contact with the water for long periods. However when one of the mixed solvents is used, the peroxide is added to the solvent mixture just prior to its being fed to the oxidation catalyst. The peroxide may be hydrogen peroxide, butyl hydrogen peroxide, di-t-butyl peroxide, dibenzoyl peroxide, diethyl peroxide, dicetyl peroxide, etc. Advantageously the concentration of the peroxide is in the range of 1% to 18%, preferably 3% to 15%.

The catalyst bed during the regenerative or reactivation treatment is effected at a temperature of 100° C. to 1200° C., preferably 250° C. to 1200° C. This temperature may be maintained by the operation of the internal combustion engine from which the exhaust gas is generated.

The volume of regenerative material or peroxide solution is advantageously used in the range of 0.5 liter to 1 liter per liter of catalyst bed. The contact time of peroxide with oxidation catalyst bed is advantageously in the range of 20-1 80 seconds . However the time of reactivation treatment depends somewhat on the porosity of the catalyst bed. With a clogged bed, the passage of the regenerative solution will be delayed to a longer passage time. Therefore, the regenerative time may be extended to a range of 20 seconds to 200 seconds.

In summary, the process of this invention applies to the reactivation or rejuvenation of oxidation catalysts which have lost their efficiency. This is particularly appropriate for porous catalyst beds, i.e., of beads, pellets or honeycombs, which support the oxidation catalyst, for example, alumina on which platinum is embedded or deposited. Other oxidation catalysts used in reducing the emission of undesirable gases from the exhausts of internal combustion engines are also appropriate for their regeneration by the practice of this invention.

DESCRIPTION OF THE PREFERRED EMBODIMENT

The general procedure in applying the process of this invention is one in which the vehicle's engine is warmed up either by driving or idling until the motor and the catalyst reach the usual maximum temperature.

The exhaust is analyzed for its hydrocarbon (HC), carbon monoxide (CO) , carbon dioxide ($CO_2$), and oxygen ($O_2$) contents, both at idle speed and at higher speed, both at the tail pipe and optionally in the exhaust line between the engine and the converter, for example, at the drilled hole or at the port of the oxygen sensor.

A container is charged with an aqueous solution of hydrogen peroxide ranging from 1% to 18%, preferably 3% to 15%, and ranging in volume from one to ten liters, depending on the volume of the catalyst to be treated. The charged container is connected through a tube to the exhaust line leading to the catalyst, for example, at the drilled hole, preferably within about 40 centimeters of the catalyst bed.

The RPM of the engine may be varied somewhat with various adjustments but for comparative purposes in the experiments reported herein is raised to and maintained at around 2500 RPM. The peroxide solution is pumped or forced by pressure into the exhaust pipe, advantageously near the catalyst bed, for example, within 40 centimers; and through the catalyst in 20 to 200 seconds, depending on the volume. The rate of flow may be controlled by the pressure, or the pressure can be fixed and the flow controlled by a valve used to give a fixed rate of flow. Generally pressures up to 50 psi are suitable for the purposes of this invention.

After this feed, the RPM of the engine is maintained at around 2500 for 3 to 15 minutes, in order to dry the catalyst. The exhaust is again analyzed for HC, CO, $CO_2$ and $O_2$ at idle and at higher RPM, at the tailpipe and optionally in the exhaust line before the catalytic converter, for example, the drilled hole or the $O_2$ sensor port.

When a vehicle has more than one converter, each needs to be connected with separate feed lines from the same solution container, or each treated separately one after the other. The catalyst volume in the converters of American-made cars have a volume of about 1 gallon or 4 liters.

EXAMPLE 1

This example represents al so one of the preferred procedures of regenerating the activity of the catalyst of an auto converter without any moving or alteration or disassembly of the catalyst bed.

A V-8 1984 Lincoln Towncar, driven 47,844 miles, mainly in the City of St. Petersburg, Fla., was used for this example. The catalyst volume was about 1 gallon.

The car was lifted. The car has two three-way converters, that is, with catalysts for eliminating nitrogen oxides ($NO_x$), hydrocarbons (HC) and carbon monoxide (CO).

The regenerating process was carried out as follows: One hole was drilled and threaded through the wall of each of the two exhaust pipes upstream to the converter, that is between the converter and the oxygen sensor, about 20 cm from the converter. These holes were tapped and closed. The car was lowered and driven 12 miles at maximum legal speed on a highway.

Returning the car to the lift without shutting the engine off, the emission was tested at the tailpipe by a four-gas analyzer both at idle and 2500 RPM. The data was printed out and is shown in Table 1a. Immediately following this emission test, two Teflon tubes from a stainless steel container were connected to the tapped ports on the exhaust pipes and by a pump, 2 quarts of an aqueous solution of 3% hydrogen peroxide was pumped parallel through both converters at 40 psi in 100 seconds while the motor was run at 2500 RPM. The 2500 RPM was maintained for an additional 3 minutes. During this time, most of the condensation and steaming ceased at the tailpipe.

The car was lowered and driven again 13 miles at maximum allowable speed on highway. After the car was returned, it was lifted without stopping the motor and the emission retested at the tailpipe at idle and 2500 RPM. The data was printed out and is shown in Table 1b.

It can be seen that this treatment restored the catalytic activity so that the hydrocarbons were reduced from 196 ppm to 8; and the carbon monoxide was reduced from 3.01% to zero at idle speed. This is an over 95% reduction of these pollutants, at idle RPM, at which the emission is the worst.

TABLE 1

| | EMISSION | | | |
|---|---|---|---|---|
| Table 1a Before Treatment | | | Table 1b After Treatment | |
| Engine Speed | Idle | 1000 RPM | Idle | 1000 RPM |
| Carbon Monoxide | 3.01 | % | 0.00 | % |
| Hydrocarbons | 196 | Ppm | 8 | Ppm |
| Carbon Dioxide | 13.35 | % | 10.54 | % |
| Oxygen | 0.41 | % | 5.66 | % |
| Engine Speed | 2500 | RPM | 2500 | RPM |
| Carbon Monoxide | 0.00 | % | 0.00 | % |
| Hydrocarbons | 33 | Ppm | 8 | Ppm |
| Carbon Dioxide | 9.77 | % | 9.92 | % |
| Oxygen | 6.75 | % | 6.61 | % |
| Reduction of Pollutants at | | Idle | | 2500 RPM |
| Hydrocarbons (HC) | | 96% | | 83% |
| Carbon Monoxide (CO) | | 100% | | NA |

The activity of this regenerated catalyst was retested after a four and one half months of city driving. Two results are shown: Table 1c is before and 1d is after an engine and the fuel system cleaning by an Enginewity process.

| Table 1c Before Treatment | | | Table 1d After Treatment | | |
|---|---|---|---|---|---|
| 2500 RPM | | | 2500 RPM(Allen) | | |
| HC | 9 | Ppm | HC | 5 | Ppm |
| CO$_2$ | 10.89 | % | CO$_2$ | 9.45 | % |
| CO | .00 | % | CO | .00 | % |
| O$_2$ | 7.5 | % | O$_2$ | 8.0 | % |

These results indicate a sustained catalytic activity.

EXAMPLE 2

Two government emission tests by a Pinellas County, Fla., test station were utilized to show the effectiveness of the catalyst regeneration process of this invention. The catalyst failed the emission test before the treatment and passed after the treatment.

The car used: 1976 Oldsmobile, driven 126,000 miles, VIN #3N39R6X103416, License #CV157N
Test Procedure: Preferred
Pretest Run: 60 minutes at variable RPM
Emission Tested: See Table 2a
Solution Used: 2 qts. 3% aqueous hydrogen peroxide
Application: Passed through in 40 seconds at 2000 RPM
Post Treatment: Driving 20 miles in normal traffic
Emission Tested: See Table 2b

TABLE 2

| EMISSION | | | | | |
|---|---|---|---|---|---|
| 2a Before Treatment | | | 2b After Treatment | | |
| Idle | | | Idle | | |
| HC | 1553 | Ppm | HC | 31 | Ppm |
| CO | 0.33 | % | CO | 0.19 | % |
| CO$_2$ | 9.0 | % | CO$_2$ | 14.0 | % |
| Reduction of Pollutants at: | | | Idle | | RPM |
| Hydrocarbons | | | 98% | | |
| Carbon Monoxide | | | 42% | | |

EXAMPLE 3

Car: Ford Van Economo 150, 8 cylinder, 1987 engine, driven 75,375 miles
Test Procedure: Preferred
Pretest Run: Idle run 30 minutes
Emission Tested: See Table 3a
Solution used: 1.8 liters of 10% aqueous hydrogen peroxide
Application: Passed through the catalyst in 70 seconds while holding the RPM at 2500
Post Treatment: Keeping the RPM at 2500 for 3 more minutes
Emission Tested: See Table 3b

TABLE 3

| EMISSION | | | | | |
|---|---|---|---|---|---|
| 3a Before Treatment | | | 3b After Treatment | | |
| Idle | | | Idle | | |
| HC | 95 | Ppm | HC | 13 | Ppm |
| CO$_2$ | 9.58 | % | CO$_2$ | 9.90 | % |
| CO | .13 | % | CO | .01 | % |
| O$_2$ | 8.7 | % | O$_2$ | 8.4 | % |
| 2500 RPM | | | 2500 RPM | | |
| HC | 65 | Ppm | HC | 9 | Ppm |
| CO$_2$ | 9.16 | % | CO$_2$ | 10.20 | % |
| CO | 1.51 | % | CO | .04 | % |
| O$_2$ | 7.8 | % | O$_2$ | 7.8 | % |
| Reduction of Pollutants: | | | Idle | | 2500 RPM |
| Hydrocarbons | | | 86% | | 86% |
| Carbon Monoxide | | | 92% | | 97% |

EXAMPLE 4

Before the tests, the catalytic beads were removed from the converter, examined, then changed back into the converter.

The color of these beads was black. The measured bulk density was 0.731 gram per cubic centimeter or 45.7 lbs. per cubic ft.

Motor: A 4 cylinder motor was mounted on a movable steel frame and a GM-type catalytic converter was connected to it.

Pretest Run: 15 min. idle, plus 10 minutes at 2500 RPM

Emission Tested: See Table 4a
Solution Used: 1650 ml 11% aqueous hydrogen peroxide
Application: Passed through the catalyst in 40 seconds
Post Run: 20 minutes at 2200–2500 RPM
Emission Tested: See Table 4b

TABLE 4

| EMISSION | | | | | |
|---|---|---|---|---|---|
| 4a Before Treatment | | | 4b After Treatment | | |
| Idle | | | Idle | | |
| HC | 90 | Ppm | HC | 9 | Ppm |
| $CO_2$ | 11.47 | % | $CO_2$ | 11.99 | % |
| CO | .26 | % | CO | .03 | % |
| $O_2$ | 5.9 | % | $O_2$ | 6.0 | % |
| 2500 RPM | | | 2500 RPM | | |
| HC | 120 | Ppm | HC | 28 | Ppm |
| $CO_2$ | 13.00 | % | $CO_2$ | 14.75 | % |
| CO | 3.04 | % | CO | .42 | % |
| $O_2$ | 1.6 | % | $O_2$ | 2.7 | % |
| Reduction of Pollutants | | | Idle | 2500 RPM | |
| Hydrocarbons | | | 90% | 77% | |
| Carbon Monoxide | | | 88% | 86% | |
| Decrease in bulk density: | 4% | | | | |
| Change in color: | From black to orange | | | | |
| Hardness: | 98.5% as compared to new catalyst of: 95.8% | | | | |

See Table 11

EXAMPLE 5

The regenerating process was carried out as follows: One hole was drilled and threaded through the wall of the exhaust pipe upstream to the converter, that is between the converter and the oxygen sensor, within 40 centimeters of the converter. This hole was used for injecting the regenerating solution into the catalytic converter. The catalyst has a volume of ½ gallon or 2 liters. During the warm-up and after the treatment this hole was plugged.

Car used for test—1983 Oldsmobile, V-6, 3-liter engine with carburetor, driven 68,000 miles
Procedure: Preferred
Pretest Run: 15 minutes idle
Emission Tested: See Table 5a
Solution Used: ½ gallon 3% aqueous peroxide at 2500 RPM in 45 seconds
Post Run: 3 minutes at 2500 plus 10 min. idle
Emission Tested: See Table 5b

TABLE 5

| EMISSION | | | | |
|---|---|---|---|---|
| | 5a Before Treatment | | 5b After Treatment | |
| Engine Speed | Idle | RPM | Idle | RPM |
| Carbon Monoxide | 0.71 | % | 0.02 | % |
| Hydrocarbons | 127 | Ppm | 13 | Ppm |
| Carbon Dioxide | 9.85 | % | 12.96 | % |
| Oxygen | 6.06 | % | 2.83 | % |
| Engine Speed | 2500 | RPM | 2500 | RPM |
| Carbon Monoxide | 0.48 | % | 0.00 | % |
| Hydrocarbons | 90 | Ppm | 45 | Ppm |
| Carbon Dioxide | 9.38 | % | 10.57 | % |
| Oxygen | 6.75 | % | 5.80 | % |
| Reduction of Pollutants at: | | Idle | 2500 RPM | |
| Hydrocarbons: | | 90% | 50% | |
| Carbon Monoxide | | 97% | 100% | |
| Activity retested after 18,400 miles (4 months) additional driving and found: | | | | |
| Reduction of Pollutants at: | | Idle | 2500 RPM | |
| Hydrocarbons: | | 84% | 81% | |
| Carbon Monoxide | | 100% | 96% | |

At this rate of decreasing activity it would take approximately 4 years of similar driving to increase the hydrocarbon emission to the original 127 ppm measured before the treatment of the catalyst by this novel process.

EXAMPLE 6

This example is included to show that though in general, the oxygen is needed to oxidize the unburned hydrocarbons and carbon monoxide in exhaust gas, the oxygen alone in its gaseous form caused no improvement in activity of a muffler catalyst. One of the reasons could be that if the surface of the catalyst is coated, or the pores blocked with contaminants other than carbonaceous materials, for example, sulfur derivatives or rust, the gas can't sweep them off. The peroxide solution however, due to the rushing mass of mist and steam, can dissolve, strip-off and carry away the deposited contaminants.

Motor: 4 cylinder mounted on a steel frame. Warmed up by running it at 1500 RPM for 20 minutes
Emission tested: See Table 6a
Gas used: Pure oxygen gas passed through the catalyst bed at a rate of 20.3 liters per minute for 10 minutes, while the RPM of the engine was kept at 2500.
Emission tested: See Table 6b

TABLE 6

| EMISSION | | | | | |
|---|---|---|---|---|---|
| | 6a Before Treatment | | | 6b After Treatment | |
| | Idle | | | Idle | |
| HC | 25 | Ppm | HC | 26 | Ppm |
| CO | 0.00 | % | CO | 0.00 | % |
| $CO_2$ | 13.28 | % | $CO_2$ | 12.64 | % |
| $O_2$ | 4.6 | % | $O_2$ | 4.9 | % |
| | 2500 RPM | | | 2500 RPM | |
| HC | 17 | Ppm | HC | 25 | Ppm |
| CO | 0.00 | % | CO | 0.00 | % |
| $CO_2$ | 14.84 | % | $CO_2$ | 14.19 | % |
| $O_2$ | 2.7 | % | $O_2$ | 3.0 | % |
| Change in Pollutants: | | | Idle | 2500 RPM | |
| Hydrocarbons | | | 25–26 | 17–25 | |
| Carbon Monoxide | | | Zeros | Zeros | |

The above data show no regenerative effect on the oxidation catalyst.

EXAMPLE 7

This example demonstrates that using extra air flow through the hot catalyst was ineffective to improve the activity of the catalyst in the converters.

A monolith supported catalyst in a converter was connected to the 4-cylinder auto engine used for Example 6. The motor and the converter were heated up by running the engine at 1370 RPM for about 1 5 minutes. The emission was measured and the results are given in Table 7a.

Extra air at 20 psi was passed through the catalyst at fast rate for 1 2 minutes keeping the RPM at about 2 50 0 . Emission analysis was made at this RPM. The results are shown in Table 7b.

The air pressure was increased to 30 psi and the air passed through the converter for 10 minutes at 2500 RPM. The emission analysis shown in Table 7c shows no improvement in activity as compared to both the 7a and 7b tests.

| EMISSION | | | | | | | | |
|---|---|---|---|---|---|---|---|---|
| 7a | | | 7b | | | 7c | | |
| Time 8:57 Before Air at 1370 RPM | | | Time 9:10 Air at 20 psi at 2500 RPM | | | Time 9:20 Air at 30 psi at 2544 RPM | | |
| HC | 21 | Ppm | HC | 30 | Ppm | HC | 31 | Ppm |
| $CO_2$ | 10.41 | % | $CO_2$ | 11.49 | % | $CO_2$ | 11.59 | % |
| CO | .05 | % | CO | .09 | % | CO | .08 | % |
| $O_2$ | 7.9 | % | $O_2$ | 6.1 | % | $O_2$ | 5.5 | % |

Conclusion:

These results show that no improvement in activity of the honeycomb supported catalyst was achieved by using only extra air.

EXAMPLE 8

A converter, containing a dark and rusty monolith supported catalyst, was attached to the 4-cylinder motor and heated to operating temperature by running the motor for 10 minutes at about 1400 RPM. The emission was measured and is shown in Table 8a.

The catalyst was regenerated by passing through the converter a 10% aqueous hydrogen peroxide solution at 2500 RPM in 30 seconds from the pressurized container under 40 psi. The 2500 RPM was maintained for an additional 3 minutes. It was possible to look at the catalyst through the far end and observe that during the process the catalyst was glowing red, and during the peroxide treatment the color changed from the initial dark-rusty color to a clean, light gray color. The emission was tested as before at about 1400 RPM. The results are shown in Table 8b.

TABLE 8

| EMISSION | | | | | |
|---|---|---|---|---|---|
| 8a Before Treatment | | | 8b After Treatment | | |
| HC | 13 | Ppm | HC | 2 | Ppm |
| $CO_2$ | 10.77 | % | $CO_2$ | 11.95 | % |
| CO | .01 | % | CO | .01 | % |
| $O_2$ | 8.0 | % | $O_2$ | 6.1 | % |
| Reduction in hydrocarbon pollutant: 85% | | | | | |

EXAMPLE 9

This experiment was carried out to test the effect of a reducing agent on the catalytic activity of a muffler catalyst.

Two liters of 10% aqueous solution of Hydrazin was passed through a hot converter, containing beaded catalyst, in 20 seconds at 2500 RPM. The 2 500 RPM was maintained for an additional 10 minutes to dry the catalyst. During this time a periodical reaction took place resulting in white steam-like exhaust.

Emission analysis made at 1200 RPM before and after the Hydrazin treatment is shown below in Tables 9a and 9b respectively.

TABLE 9

| EMISSION | | | | | |
|---|---|---|---|---|---|
| 9a Before Treatment | | | 9b After Treatment | | |
| HC | 14 | Ppm | HC | 13 | Ppm |
| $CO_2$ | 13.35 | % | $CO_2$ | 15.23 | % |
| CO | 0.00 | % | CO | 0.00 | % |
| $O_2$ | 5.4 | % | $O_2$ | 2.5 | % |

This reduction in hydrocarbon emission is insignificant and suggests that contrary to the effectiveness of oxidizers like peroxides the reducers like Hydrazin are an ineffective rejuvenator of oxidation catalysts.

EXAMPLE 10

This example is outside of the preferred process and illustrates that a caustic solution is not effective to improve the catalytic activity although the use of alkali solutions has been reported.

Car Used: 1985 Honda Accord, 4 cylinder with carburetor, VIN #1HGAD7435FA107006, driven 60,000 miles. The engine was warmed up by idle run for 40 minutes.

Emission tested: See Table 10a

Solution Used: 1 quart of 2.5% sodium hydroxide in water

Application: Passed through the converter in 40 seconds at 2500 RPM

Post Treatment: Kept the 2500 RPM for 6 minutes

Emission tested: See Table 10b

TABLE 10

| EMISSION | | | | | |
|---|---|---|---|---|---|
| 10a Before Treatment | | | 10b After Treatment | | |
| Idle | | | Idle | | |
| HC | 9 | Ppm | HC | 30 | Ppm |
| CO | 0.00 | % | CO | 0.00 | % |
| $CO_2$ | 13.92 | % | $CO_2$ | 14.44 | % |
| $O_2$ | 2.16 | % | $O_2$ | 1.62 | % |
| 2162 RPM | | | 2670 RPM | | |
| HC | 7 | Ppm | HC | 8 | Ppm |
| CO | 0.01 | % | CO | 0.00 | % |
| $CO_2$ | 15.02 | % | $CO_2$ | 15.09 | % |
| $O_2$ | 0.27 | % | $O_2$ | 0.27 | % |
| Change in Pollutants: | | Idle | | 2600 RPM | |
| Hydrocarbons Ppm | | 9 to 30 | | 7 to 8 | |
| Carbon Monoxide % | | Zeros | | Zeros | |

ATTRITION TEST

The following test was designed to deter mine whether any weakening of the catalyst carrier, like that of the alumina beads occurs due to the rejuvenation process disclosed in this patent application. The results allow the assumption that an alumina coating on the monolith (honeycomb) support behaves similarly to that of the beaded alumina support.

The testing process involves charging fifty grams of beaded (or pelletized) catalyst into a one quart size jar and rotated horizontally on rollers at 220 RPM for twelve hrs.

The beads are separated from the powder by screening and the beads are weighed. The recovered beads are expressed in percentage of the original weights, that is the 50 grams. To have a reference, a new catalyst on alumina beads was also tumbled for the same set time of 12 hours at 220 RPM. The test results are shown in Table 6.

TABLE 11

| Catalyst | Rejuvenation Treatment | Tumbled at | Hours | % Recovered Beads |
|---|---|---|---|---|
| 1. New | None | 220 RPM | 12½ | 95.8% |
| 2. Used | None | 220 RPM | 12 | 94.3% |
| 3. Example 4 | Yes | 220 RPM | 12 | 98.5% |
| 4. #2 above | Yes | 220 RPM | 12½ | 94.8% |

This test shows that the hardness of the catalyst beads is slightly reduced in the catalytic converter (#1 vs #2). The test results also show that the rejuvenation process does not reduce the hardness of the beads. In fact, if anything, it slightly increases the hardness. (#3 and 4 vs #1 and 2)

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A process for regenerating the activity of an oxidation catalyst used for reducing the content of undesired pollutants in the exhaust from an internal combustion engine in which oxidation catalyst activity has been reduced by use, said process comprising the steps of (a) maintaining the oxidation catalyst at a temperature encountered when said engine is operated, (b) passing into intimate contact with said oxidation catalyst a solution of a peroxide which decomposes at the temperature at which said oxidation catalyst is maintained, the temperature at which said oxidation catalyst is maintained being in the range of 100° C. to 1200° C., the solvent in which said peroxide is dissolved in said solution being selected from the class consisting of water, a mixture of water and ethanol, and a mixture of water and isopropanol, each said mixture containing at least 50 percent by weight of water, the concentration of said peroxide in said solution being in the range of 1 percent by weight to 18 percent by weight, and the proportion of volume of peroxide solution to volume of catalyst being in the range of 0.5 volume to one volume of said solution per volume of said catalyst, and (c) terminating said passing of said solution of peroxide after said catalyst has been sufficiently regenerated.

2. The process of claim 1 in which said catalyst temperature is in the range of 250° C. to 1200° C.

3. The process of claim 2 in which said peroxide solution has a concentration of 3 percent by weight to 15 percent by weight.

4. The process of claim 3 in which said peroxide is hydrogen peroxide.

5. The process of claim 4 in which said solvent is water.

6. The process of claim 1 in which said solvent is water.

7. The process of claim 5 in which the feed time of said peroxide solution to said catalyst is in the range of 20–200 seconds.

8. The process of claim 3 in which the feed time of said peroxide solution to said catalyst is in the range of 20–200 seconds.

9. The process of claim 1 in which the feed time of said peroxide solution to said catalyst is in the range of 20–200 seconds.

10. The process of claim 1 in which said peroxide solution is added at a point upstream from said oxidation catalyst and within 40 centimeters from said oxidation catalyst.

11. The process of claim 5 in which said peroxide solution is added at a point upstream from said oxidation catalyst and within 40 centimeters from said oxidation catalyst.

12. The process of claim 9 in which said peroxide catalyst is added at a point upstream from said oxidation catalyst and within 40 centimeters from said oxidation catalyst.

13. The process of claim 10 in which the addition of said peroxide solution is conducted for a period in the range of 20 seconds to 200 seconds.

* * * * *